United States Patent
Swart

(10) Patent No.: US 10,412,541 B2
(45) Date of Patent: *Sep. 10, 2019

(54) REAL-TIME LOCATION SYSTEM (RTLS) THAT USES A COMBINATION OF BED-AND-BAY-LEVEL EVENT SENSORS AND RSSI MEASUREMENTS TO DETERMINE BAY-LOCATION OF TAGS

(71) Applicant: Infinite Leap Holdings, LLC, Fargo, ND (US)

(72) Inventor: John A. Swart, Grand Rapids, MI (US)

(73) Assignee: Infinite Leap Holdings, LLC, Fargo, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/241,758

(22) Filed: Jan. 7, 2019

(65) Prior Publication Data

US 2019/0141473 A1    May 9, 2019

Related U.S. Application Data

(63) Continuation of application No. 16/010,732, filed on Jun. 18, 2018, now Pat. No. 10,231,078, which is a
(Continued)

(51) Int. Cl.
| | |
|---|---|
| *H04W 24/00* | (2009.01) |
| *H04W 4/02* | (2018.01) |
| *G08B 13/24* | (2006.01) |
| *H04W 4/80* | (2018.01) |
| *H04L 29/08* | (2006.01) |

(Continued)

(52) U.S. Cl.
CPC ............ *H04W 4/02* (2013.01); *G01S 5/0036* (2013.01); *G01S 5/14* (2013.01); *G08B 13/2462* (2013.01); *H04L 67/12* (2013.01); *H04W 4/80* (2018.02); *H04L 29/08657* (2013.01); *H04L 67/18* (2013.01); *H04M 1/72519* (2013.01); *H04M 1/72522* (2013.01); *H04W 4/33* (2018.02);
(Continued)

(58) Field of Classification Search
CPC ....... H04W 4/02; H04W 8/005; H04W 88/02; H04W 64/00; H04W 8/245; G08B 13/2462; H04M 1/72519; H04M 1/72522; H04L 29/08657; G06K 7/0008; G06K 19/0723
USPC ...... 455/456.2, 456.5, 550.1, 418; 340/572.1
See application file for complete search history.

(56) References Cited

U.S. PATENT DOCUMENTS

| | | |
|---|---|---|
| 9,810,767 B1 | 11/2017 | Hamilton |
| 2007/0046434 A1 | 3/2007 | Chakraborty |

(Continued)

*Primary Examiner* — Danh C Le
(74) *Attorney, Agent, or Firm* — Frank M. Scutch, III

(57) ABSTRACT

A real-time location system (RTLS) having tags, bridges, bay-level event sensors and a location engine for use in determining the bay location of tags, To determine which bay a tag is in, bay-level event sensors sense motion events in the bay, transmit the motion event reports to a location engine, and/or tags. Tags contain an accelerometer, to sense motion of the tags. A series of location-engine steps estimates the bay-level-location of the tags based on a combination of received signal-strength analysis, and a comparison of tag-motion status to the perceived motion events in a bay. The analysis of tag-motion status and motion-in-bay events produces a better estimate of bay-level location of the tag than a received-signal-strength estimate can produce alone.

12 Claims, 3 Drawing Sheets

Related U.S. Application Data continuation-in-part of application No. 15/610,072, filed on May 31, 2017, now Pat. No. 10,028,105.

(60) Provisional application No. 62/623,561, filed on Jan. 30, 2018, provisional application No. 62/343,242, filed on May 31, 2016.

(51) Int. Cl.
| | |
|---|---|
| *G01S 5/00* | (2006.01) |
| *G01S 5/14* | (2006.01) |
| *H04W 8/00* | (2009.01) |
| *H04M 1/725* | (2006.01) |
| *H04W 64/00* | (2009.01) |
| *H04W 4/33* | (2018.01) |
| *H04W 4/90* | (2018.01) |

(52) U.S. Cl.
CPC .............. *H04W 4/90* (2018.02); *H04W 8/005* (2013.01); *H04W 64/00* (2013.01)

(56) References Cited

U.S. PATENT DOCUMENTS

| | | | |
|---|---|---|---|
| 2008/0012767 A1* | 1/2008 | Caliri | G01S 5/021 342/463 |
| 2009/0309732 A1* | 12/2009 | Truscott | G08B 13/06 340/572.1 |
| 2011/0025464 A1* | 2/2011 | Geng | G01S 5/021 340/10.1 |
| 2011/0057797 A1* | 3/2011 | Parker | G08B 21/22 340/568.1 |
| 2011/0072132 A1 | 3/2011 | Shafer | |
| 2011/0080267 A1 | 4/2011 | Clare | |
| 2012/0015665 A1* | 1/2012 | Farley | G01S 5/0036 455/456.1 |
| 2013/0069799 A1* | 3/2013 | Ma | G08G 1/07 340/907 |
| 2013/0141233 A1 | 6/2013 | Jacobs | |
| 2013/0201003 A1 | 8/2013 | Sabesan | |
| 2013/0212094 A1* | 8/2013 | Naguib | G01C 21/206 707/730 |
| 2014/0351498 A1 | 11/2014 | Hsueh | |
| 2015/0063472 A1 | 3/2015 | Chatterton | |
| 2015/0145671 A1* | 5/2015 | Cohen | G08B 21/18 340/539.11 |
| 2015/0223309 A1* | 8/2015 | Mohan | G05B 15/02 315/153 |
| 2016/0029160 A1 | 1/2016 | Theurer | |
| 2016/0295358 A1 | 10/2016 | Cariss | |
| 2016/0295376 A1 | 10/2016 | Geng et al. | |
| 2016/0353238 A1* | 12/2016 | Gherardi | H04W 4/021 |
| 2017/0142549 A1 | 5/2017 | Herbert | |
| 2017/0313426 A1 | 11/2017 | Morin | |

\* cited by examiner

REAL-TIME LOCATION SYSTEM (RTLS) THAT USES A COMBINATION OF BED-AND-BAY-LEVEL EVENT SENSORS AND RSSI MEASUREMENTS TO DETERMINE BAY-LOCATION OF TAGS

FIELD OF THE INVENTION

The present invention relates generally to a real-time location system (RTLS) having active tags, bridges, and one or more bed-and-bay-level event sensors, that pass sufficient sensor data to a location engine in a central server, to locate tags at bay-level in a multi-bay room within a hospital.

BACKGROUND OF THE INVENTION

RTLS systems estimate locations for moving tags or moving personnel badges within a floor plan of interior rooms, in buildings such as hospitals. Many RTLS systems based on radio-frequency signals such as Wi-Fi or Bluetooth Low Energy (BLE), are designed to have moving tags that transmit a radio signal, within a field of receiving devices called bridges, gateways, sensors, or Access Points. A network of bridges will measure and use received signal strength of transmissions from a tag, as a proxy for estimating the distance between the tag and each bridge, and then use multi-lateration algorithms to estimate the locations of tags. Those approaches with tags that transmit are standard in the industry and provide location estimates that are acceptable for may use cases in industrial and manufacturing environments. They may even be accurate enough to locate tagged assets and tagged people with accuracy within 1-meter or less. But the approaches common in the industry fail to provide an efficient location system for determining the precise location of a tag at bay-level or bed-level in large, open patient-care areas in hospitals, or in a hospital room with two patient beds.

Hospitals typically have several, large, patient-care rooms where may patients can be treated simultaneously, such as an ED receiving room, a prepare-for-surgery room, a recovery-from-surgery room, or an infusion room. These large rooms are designed with a set of small bays, where each bay is defined as a treatment area for one patient. Each bay usually has enough floor space to hold one bed, and/or one chair, for a patient to lie in or sit in. The bays may be separated by a curtain. The curtain may be suspended from a track in the ceiling of the bay, which allows a curtain to be drawn or retracted to provide a private space for the patient's care. The bays may alternatively be divided by a structural half-wall or other privacy structure.

Hospitals also have patient rooms for inpatients which are shared by two or more patients in two or more beds. The beds in these shared multi-patient rooms are typically separated by a curtain.

RTLS systems in hospitals in common use may be able to determine or estimate the location of tagged assets, patients and staff members at a room level or with 1-meter accuracy, but RTLS systems in common use fail to determine reliably which bay the tag resides in. For example, the common RTLS system struggles to determine which side of the curtain a tag resides on. A better location system is required that can reliably determine which side of a curtain a tag resides on, so the hospital can determine which bay a patient is seated in, and which caregivers are in the bay with the patient, and determine which assets are in the bay with the patient. Similarly, RTLS systems in common use fail to determine which bed a tag resides on or near, in a multi-patient room.

To illustrate the accuracy problem, imagine a hospital patient-care area that is a large room, hosting many patients, divided into bays. Patients may sit in beds or lie or chairs just 1 meter apart from each other, separated by a curtain. For some hospital use cases, an RTLS system must be accurate enough to determine which bed, chair or bay a patient is located in, and also determine which pieces of medical equipment are in the same bay with that patient, and also determine which staff members are in the same bay with that patient. An RTLS system that uses radio-signals may be able to estimate a location for a patient, asset or staff member within 1-meter accuracy, but still struggle to answer the question of precisely which side of the curtain the tagged asset, patient or staff member is on because the patients are only 1 meter apart. RTLS systems have used infrared light or ultrasound signals to build "virtual walls" where the curtains separate the bays, but these systems require significant design, engineering, tuning, and cost.

The current invention proposes a novel use of a bay-level event sensor. A bay-level event sensor is defined as an electronic sensing device that can determine whether an event occurs in one bay, or its adjacent bay. In one embodiment of the invention, a bay-level event sensor may be a fixed thermographic camera, and the bay-level event it senses is motion in the bay, of an object that appears to be the size and shape of a human person. The fixed camera can sense motion in one bay, without sensing motion in any nearby bay. Or the camera can sense multiple bays, and through analysis of one or more camera images, determine which bay an event is occurring in. In another embodiment, a bay-level event sensor may be a pressure sensor on a bed or chair. The bay-level event it senses is the action of a person sitting down or rising from a bed or chair. The bay-level pressure sensor can determine whether a person is sitting in a chair or bed in a precise bay, without sensing a person sitting in any adjacent bay.

The event that each bay-level event sensor detects, occurring in a specific bay but not an adjacent bay, is generally defined as a motion event. A bay-level thermo-graphic camera may detect a human body moving in a specific bay, or a rolling equipment cart moving in a specific bay. A bay-level pressure sensor may detect a person seated in a bed or chair in a specific bay, or a motion event of a person sitting down into a chair or bed, or a motion event of a person standing up from a seated position in a chair or bed.

Estimating the location of a tag with a precision of determining which bay a tag resides in is often named "bay-level accuracy". If there is one bed in that one bay, then the bay-level accuracy may be referred to as "bed-level accuracy". If there is one chair in that one bay, then the bay-level accuracy may be referred to as "chair-level accuracy".

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
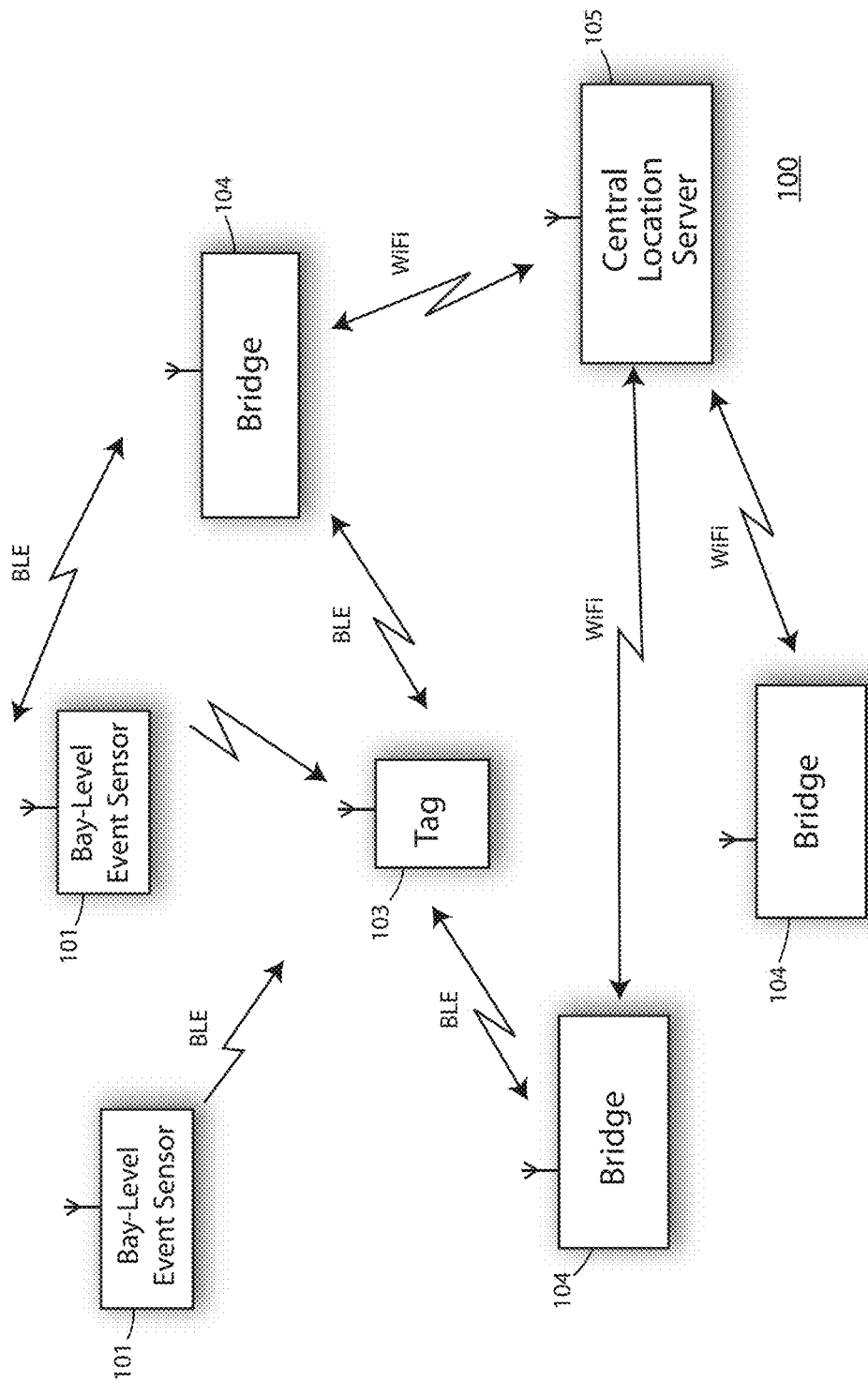
FIG. 1 is a block diagram illustrating components in an RTLS, including one or more tags, one or more bridges, bay-level-event sensors, and a location engine.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to an RTLS having active tags, bay-level event sensors, and bridges that pass location updates to a location engine in a central server. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of RTLS having tags, bridges, and bay-level event sensors. The non-processor circuits may include, but are not limited to, a radio receiver, a radio transmitter, signal drivers, clock circuits, power source circuits, and user input devices. As such, these functions may be interpreted as steps of a method to perform tag functions, bridge functions, and bay-level event sensor functions. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The current invention proposes a bay-level-accurate RTLS. Radio signals sent from the tag to the bridges provide data that the location engine may use to form a first location estimate, which likely is not precise enough for bay-level-accurate location. But the addition of the bay-level event sensors, which may include but are not limited to pressure sensors, motion sensors, thermographic cameras, infrared cameras, visible-light cameras, and/or other bay-level event sensors, provide data to the location engine which empowers the location engine to estimate the tag at bay-level.

FIG. 1 is a block diagram illustrating components used in the RTLS in accordance with various embodiments of the invention. The system 100 includes one or more fixed bay-level event sensors 101 that sense motion events, which report their sensed motion event by radio or wired transmission, including transmission to a bridge 104. Any radio transmissions from bay-level event sensors 101 that are received at the bridge 104 will be forwarded to a location engine 105. One or more mobile tags 103 transmit wireless messages to one or more bridges 104. This tag transmission will contain a report of the motion status of a tag as measured by an accelerometer on the tag. As examples, the motion status of a tag may be "the tag is not moving", or "the tag is moving slowly" or "the tag is moving with a motion that resembles a person sitting down into a chair". The received signal strength and content of this tag transmission is retransmitted by the bridges, perhaps via Wi-Fi or BLE, to the location engine 105. As is already typical in the industry, the location engine may employ trilateration algorithms on the signal strength reports it receives from multiple bridges to form one estimate of the location of the tag. With the current invention, all of the sensor information, including signal strengths of tag transmissions received at the bridges, plus bay-level sensor information about motion events, plus motion-status information reported by the tag, is factored into the location algorithm at the location engine. The output of the location engine is a location estimate, which is an estimate of the bay-level-location of the tag.

Thus, the system in FIG. 1 includes a novel feature not taught in the prior art namely; a system of tags, bridges, bay-level-event-sensors and a location engine, which enables the location engine to combine two location estimates: one location estimate based on received signal strength, and a second location estimate based on motion status of tags and motion events sensed bay-level event sensors; to produce a combined location estimate, used to store a updated, estimated bay-level location of the tag.

Figure 2:
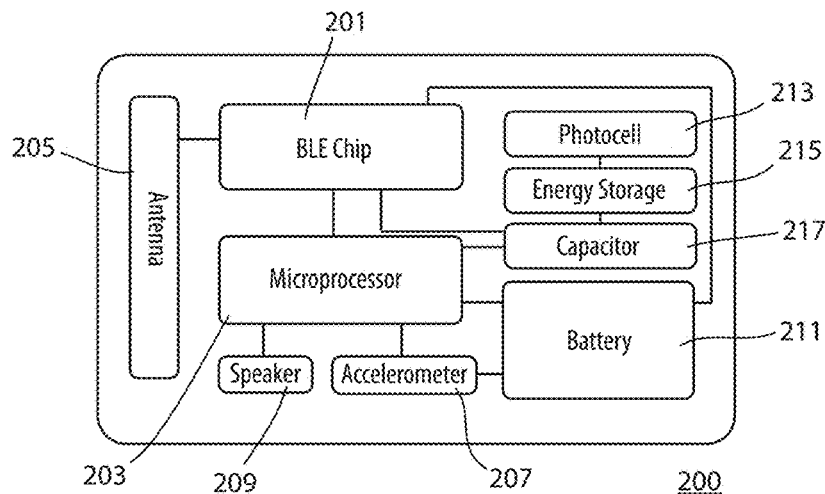
FIG. 2 is a block diagram illustrating components used in the tag.

FIG. 2 is a block diagram illustrating system components used in the tag. The tag 200 includes a transceiver 201 which transmits and receives radio frequency (RF) signals. The transceiver 201 complies with the specifications of one of the set of standards Bluetooth Low Energy (BLE), or Wi-Fi, and/or IEEE 802.15.4. The transceiver 201 is connected to a microprocessor 203 for controlling the operation of the transceiver. The transceiver is also connected to an antenna 205 for providing communication to other devices. The tag further includes an accelerometer 207 connected to the microprocessor 203 for detecting motion of the tag and a battery 209 for powering electronic components in the device.

Figure 3:
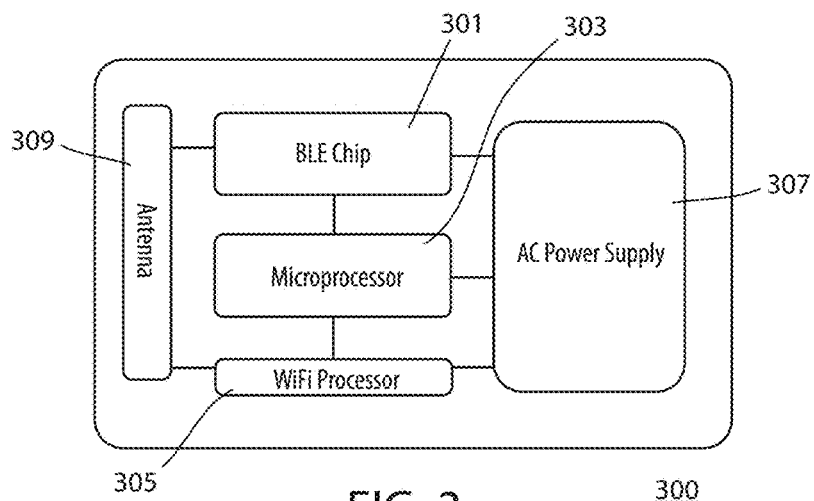
FIG. 3 is a block diagram illustrating components used in the bridge.

FIG. 3 is a block diagram illustrating components used in the bridge as seen in FIG. 1. The bridge 300 includes one or more transceivers 301 that connect to a microprocessor 303 for controlling operation of the transceiver(s) 301. A Wi-Fi processor 305 also connects to the processor 303 for transmitting and receiving Wi-Fi signals. An AC power supply 307 is connected to the transceiver 301, microprocessor 303 and the Wi-Fi processor 305 for powering these devices. The AC power supply 307 powers the bridge components. An antenna 309 is connected to both the BLE transceiver 301 and the Wi-Fi processor 305 for transmitting and receiving tag and Wi-Fi RF signals to these devices at the appropriate frequency.

Figure 4:
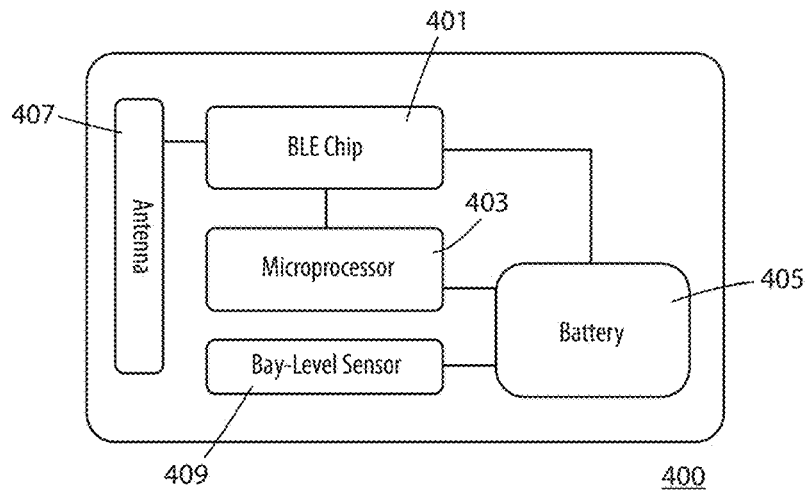
FIG. 4 is a block diagram illustrating components used in the bay-level event sensor.

FIG. 4 is a block diagram illustrating components used in a bay-level event sensor that senses motion events. Various embodiments of this bay-level event sensor that senses motion events are pressure sensors, passive infrared sensors, visible-light cameras, and thermographic cameras. Passive infrared sensors will detect human motion in the hospital bay, and the cameras may detect human and asset movement as well. The bay-level sensor 400 includes a transceiver 401 for transmitting wired or radio transmissions to report the sensed data. The transceiver 401 connects to a microprocessor 403 for controlling the transceiver(s). A battery or alternate power supply 405 connects to the transceiver(s) 401 and the microprocessor 403 for powering these devices. The bay-level event sensor 400 that uses radio includes one or more antennas 407 for providing gain. The bay-level event sensor 400 includes a motion sensor 409, which detects motion events in the bay where the bay-level motion sensor is located, which may be one of a camera, infrared or pressure sensor. The sensor 409 that detects motion events is connected to both the microprocessor 403 and battery 405, for detecting motion of anything in the bay. The bay-level event sensor 400 typically is placed in the ceiling or high on the wall of a hospital bay, so that it can sense motion anywhere within the bay. Thus, the bay-level event sensor 409 can determine if there are objects moving about the bay, to help a location engine, to correlate motion events in bays, to motion status of tags, and match moving tags to bays that are sensed to have coincident motion. The bay-level motion events can then be transmitted and/or stored in a database for determining bay-level location of one or more tags.

Figure 5:
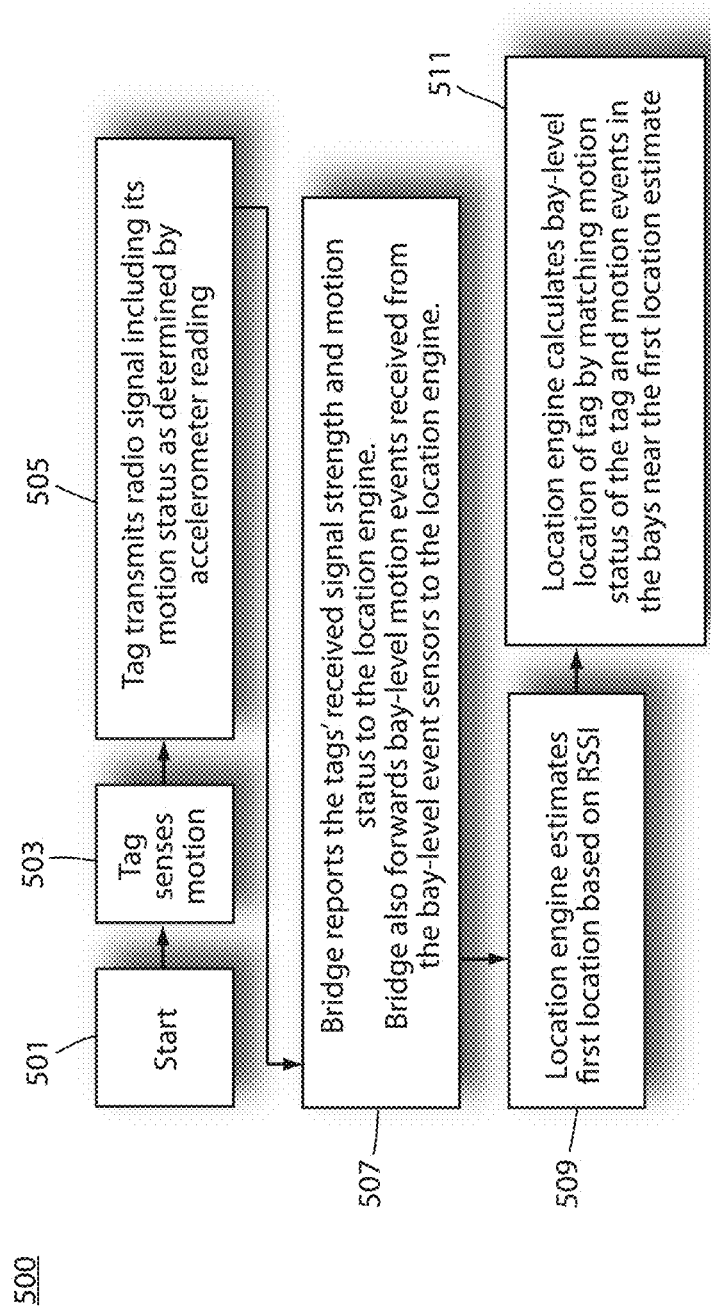
FIG. 5 is a flow chart diagram illustrating the steps using the tags, bridges, bay-level event sensors and location engine to estimate tag location.

FIG. 5 is a block diagram illustrating the steps used in the location process. The methods 500 as shown in FIG. 5 include starting the process 501 where a tag senses motion 503 with its accelerometer. The tag transmits a radio signal 505 including its accelerometer reading. One or more bridges 507 will receive the signal and forward the corresponding received-signal-strength reading and content of the transmission including the tag's accelerometer reading to a location engine. The location engine will then calculate a first location estimate based on radio signal strength indication (RSSI) data 509. Next, the location engine will calculate a second location estimate based on a comparison of motion status of the tag, and the motion-event data from bay-level event sensors 511. For example, if the location engine knows from the first location estimate that the tag is near bays 1, 2, or 3 but is uncertain which one specific bay the tag is in, and the location engine knows from tag's accelerometer reading that the motion resembles a person in the act of sitting down, and knows from bay-level event sensors the chair in bay 1 sensed someone taking a seat at that coincident moment, and knows from bay-level event sensors that the chairs in bays 2 and 3 did not sense anyone taking a seat, the location engine may report a bay-level location reading of "Bay 1". The method illustrated in FIG. 5 for the location engine may either centralize the functions described, or distribute these functions among the tag's processor and a central location-server processor.

Those skilled in the art will recognize that an attribute of the current invention is the use of tag-accelerometer motion-status and bay-level motion events that are sensed by bay-level event sensors, to refine the location estimate to bay level. Radio frequency signals can suffer fades, absorption and reflection, all of which decrease its signal strength. As a result, the location engine that relies solely on radio frequency signal strength(s) to determine location will make location-estimate errors and erroneously place an asset or person in the wrong bay. For some RTLS applications and use cases, determining which bay an asset is in, and thereby determining which patient an asset is associated, is of the utmost importance. Therefore, an RTLS system may strive to estimate and report which bay an asset is located.

Typically, in a RTLS, radio signals sent by a tag or tags to the multiple bridges will suffer from a variety of polarity fades i.e. mismatches between the polarity of the transmitting antenna on the tag and the receive antenna on the bridge. These polarity fades work to dispel the general assumption that the RSSI of the advertisement from the tag to the bridge is directly correlated to the distance between the tag and the bridge. Therefore, this adds error to the location estimate, mis-estimating which room a clean or soiled asset is placed. In addition, some of the tags will be blocked (by metal objects or other assets) from a clear line of sight to the one or more bridges, further breaking the correlation of signal strength to distance. Some of the tags will have their radio energy absorbed by human bodies or bags of water, further breaking the relationship of signal strength to distance. The tag may be placed in a location where it happens to suffer from a persistent multipath fade relative to a specific bridge, so that bridge will mis-estimate its distance to the tag. Finally, all of these radio fading effects are time-varying, as people and metal objects move through the hospital's rooms, so using radio signal strength alone to estimate the location of an asset tag will make a stationary asset appear to move from time to time.

All of these radio-fading effects make it very difficult to estimate which bay each of the assets are placed in, producing erred bay-location estimates. Bay 1 may be only 1 meter from the adjacent Bay 2. If the RTLS location algorithm has 1-meter accuracy 90% of the time, then the algorithm will fail to estimate the correct bay-level location of all assets and people 10% of the time. Hence, those skilled in the art will reach the conclusion that radio signal strength alone is insufficient for determining which bay an asset is placed in, even if it is 1-meter accurate or half-meter accurate. Signal strength measurements are degraded by too many radio fading effects.

Hence, the present invention uses bay-level event sensors to help determine which bay a tag is located. Bay-level event sensors have a relative advantage in that they perceive the motion or pressure changes inside a bay, or chair or bed within a bay, but they are oblivious to any motion in any adjacent bay (because those movements are in a different bay's bed or chair or outside the receive angle of a motion sensor or thermographic camera lens, or because the motion event occurs in a specific bay's bed or chair). In using the system and methods of present invention, the bay-level event sensor in bay 1 sees objects moving, sitting or standing in bay 1. The bay-level event sensor in bay 2 senses objects moving, sitting or standing in bay 2. Neither bay-level event sensor can sense any motion on the opposite side of the curtain in the adjacent bay.

With the present invention, each bay-level event sensor in each bay sends a periodic transmission of motion status, determined from motion events. In one embodiment of the present invention, a bay-level event sensor such as a camera, sensing no motion in its bay, includes that no-motion status indication in its transmission. When that bay-level event sensor senses motion in its bay, it transmits an indication or quantification of the motion it senses. In an alternate embodiment of the present invention, a bay-level event sensor such as a pressure sensor senses a person being seated or leaving a chair or a bed, and that motion-status event is transmitted to the location engine. Since motion-status event changes in one bay are likely to be non-coincident with motion-status event changes in an adjacent bay, each bay will have a unique "motion fingerprint" for its last few minutes of observed time. A "motion fingerprint" is a record of a bay's motion- or pressure-change events over a recent few second's time. The location engine can store these "motion fingerprints" for each bay, for use in the location estimate. When a location engine calculates an approximate location for a transmitting tag in the hospital room that has multiple bays, the location engine consults additional information to get a bay-level location fix: It will compare the patterns of the motion status of the tag as reported in the tag's transmission, to the "motion fingerprints" of one or more bays. The location engine will match a tag to a bay location based on a match between the tag's reported motion status and the bay's motion fingerprint.

In one embodiment of the present innovation, the tag is on an asset. The asset may be on a cart. The cart moves into one bay in a multi-bay hospital room. A bay-level camera senses the motion in bay 1. The asset tag transmits a radio transmission to surrounding bridges, which feed the location engine, which uses the radio signal strengths to determine that the asset is in the large room, but the location engine is not yet certain which bay the asset has arrived in. The tag's accelerometer sends a transmission stating that the tag has stopped moving, and the movement stopped at time T. One or more bay-level cameras in the room sense and report that prior to time T there was motion in bay 1, but there was no motion in bay 2 at time T. The bay-level camera then senses and reports that the motion stopped in bay 1 just after time T. The location engine can now use the bay-level event sensor information to conclude that the asset could not be in bay 2 because of the lack of coincident motion in bay 2, but the asset should be in bay 1 because of a match between the motion status of the tag's accelerometer and the motion event in bay 1.

As another illustration of the unique benefit of the current invention, consider the challenge of locating a tag-wearing staff member, or patient. Radio signals are absorbed by the human body. The location engine that uses only radio signal-strength will struggle to determine where a staff member or patient is actually located, and may report an adjacent (incorrect) bay as the location of the staff tag. In one embodiment of the current invention, the bay-level event sensor may report (in each transmission) the current motion status in the bay as measured at the bay-level event sensor, plus the motion status at predetermined time periods (e.g. six seconds ago and 12 seconds ago). As an example, one bay-level event sensor can report in a series of transmissions that there was no motion-event in a room 12 seconds ago, no motion-event six seconds ago, but there is motion currently happening in the room that is consistent with a human at walking speed. One adjacent bay-level event sensor may report no motion at all. A staff tag or patient tag reports that it is moving because of its accelerometer. The location engine can determine that the tag is unlikely to be in the bay with the bay-level event sensor that has seen no motion at all. The location engine is therefore more accurate than a system based on signal strength alone.

Hence, the RTLS in the current invention uses at least three algorithmic methods and/or processes to estimate the bay-level location of a tag. These processes include:
1) Use of radio-signal strength and trilateration to estimate a location of a tag, which may not be a bay-level-accurate estimate.
2) Matching of motion events reported by bay-level event sensors and motion status reported by tags, to estimate the bay-level location of a tag.
3) Finally, the RTLS blends its location estimates from the two processes above to finalize its bay-level location estimate for the tag.

In one embodiment of the invention, the radio-signal-strength estimate is determined in the location engine, using reports of received signal strength at the bridges. In an alternate embodiment of the invention, the radio-signal-strength estimate is determined in the tag, which listens for the radio transmissions from multiple bay-level event sensors, and estimates its own location, based on the relative signal strengths of the sensors in several bays.

In another embodiment of the invention, each bed and chair is permanently installed in a specific bay, and is administratively assigned to a bay. When a patient sits in a chair, and the location of the chair is administratively assigned to a bay, the bay-level location of the patient is derived from the bay-level location of the chair. In an alternate embodiment of the invention, each bed and chair is movable and may be located in a different bay from hour to hour or day to day. The beds and chairs will then be tagged with an active tag. The bay-level location of each bed or bay is established through the method shown in FIG. 5 as each tagged bed or chair is moved into a bay. Subsequently, when a patient sits or lies in chair or bed, the location of the patient is derived from the bay-level location of the chair or bed.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:
1. A real-time location system (RTLS) having tags, bay-level event sensors, bridges, and a location server for providing people and asset-tag locating, comprising:
   at least one tag which transmits a report of its motion status as sensed by its accelerometer;
   at least one bay-level event sensor, which transmits a report of motion events that occur in a bay to a location engine;

at least one bridge for receiving reports from at least one tag and measuring at least one characteristic of the received transmissions, including received signal strength, and forwarding those reports to a central server, and which also receives transmissions of reports from at least one bay-level event sensor, which reports motion events that occur in a bay; and a location engine for determining bay-level location of the at least one tag, and wherein the at least one tag listens to the transmitted reports of motion events from the at least one bay-level event sensor, compares the reports of motion events to its own motion status; and transmits a comparison within its report of its motion status.

2. The RTLS as in claim 1, wherein the sensor is one of a pressure sensor, a passive infrared sensor, a visible-light camera, or a thermo-graphic camera.

3. The RTLS as in claim 1, wherein the sensor transmits its detection of motion events through one of a wireless network or a wired network to the location engine.

4. The RTLS as in claim 1, wherein the tag's transceiver complies with the specifications of at least one of the standards defining Bluetooth Low Energy (BLE), Wi-Fi, or IEEE 802.15.4.

5. A real-time location system (RTLS) having tags, bay-level event sensors, bridges, and a location server for providing people and asset-tag locating, comprising:
- at least one tag which transmits a report of its motion status as sensed by its accelerometer;
- at least one bay-level event sensor, which transmits a report of motion events that occur in a bay to a location engine;
- at least one bridge for receiving reports from at least one tag and measuring at least one characteristic of the received transmissions, including received signal strength, and forwarding those reports to a central server, and which also receives transmissions of reports from at least one bay-level event sensors, which report motion events that occur in a bay;
- a location engine utilizing a both received-signal-strength information and bay-level motion-sensing information for determining bay-level location of the at least one tag; and wherein the at least one tag listens to the transmitted reports of motion status from the at least one bay-level event sensor, compares the reports of motion events to its own motion status; and transmits a comparison within its report of its motion status.

6. The RTLS as in claim 5, wherein the sensor is one of a pressure sensor, a passive infrared sensor, a visible-light camera, or a thermo-graphic camera.

7. The RTLS as in claim 5, wherein the sensor transmits its detection of motion events through one of a wireless network or a wired network to the location engine.

8. The RTLS as in claim 5, wherein the tag's transceiver complies with the specifications of at least one of the standards defining Bluetooth Low Energy (BLE), Wi-Fi, or IEEE 802.15.4.

9. An RTLS having tags, bay-level event sensors, bridges, and a location server for providing people and asset-tag locating, comprising:
- at least one tag which transmits a report of its motion status as sensed by its accelerometer;
- at least one bay-level event sensor, which transmits a report of motion events that occur in a bay to a location engine;
- at least one bridge for receiving reports from at least one tag and measuring at least one characteristic of the received transmissions, including received signal strength, and forwarding those reports to a central server, and which also receives transmissions of reports from at least one bay-level event sensors, which report motion events that occur in a bay;
- a location engine using a plurality of location-determining methods comprising:
  - a first location method for determining a first location estimate based on characteristics of radio messages transmitted from a tag and received at one or more bridges and transmitted to the location engine
  - a second location method for determining a second location estimate based on comparing bay-level motion-sensing information and tag-reported motion status, for determining bay-level location of the at least one tag; and
  - a third location method for combining the first and second location estimates to determine a bay-level location estimate for the at least one tag.

10. The RTLS as in claim 9, wherein the sensor is one of a pressure sensor, a passive infrared sensor, a visible-light camera, or a thermo-graphic camera.

11. The RTLS as in claim 9, wherein the sensor transmits its detection of motion events through one of a wireless network or a wired network to the location engine.

12. The RTLS as in claim 9, wherein the tag's transceiver complies with the specifications of at least one of the standards defining Bluetooth Low Energy (BLE), Wi-Fi, or IEEE 802.15.4.

* * * * *